May 18, 1943.  S. J. HARLEY ET AL  2,319,544
THREAD CUTTING TOOL
Original Filed March 11, 1941
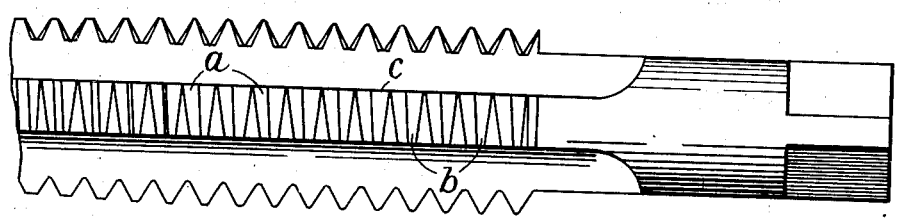
Fig:1.
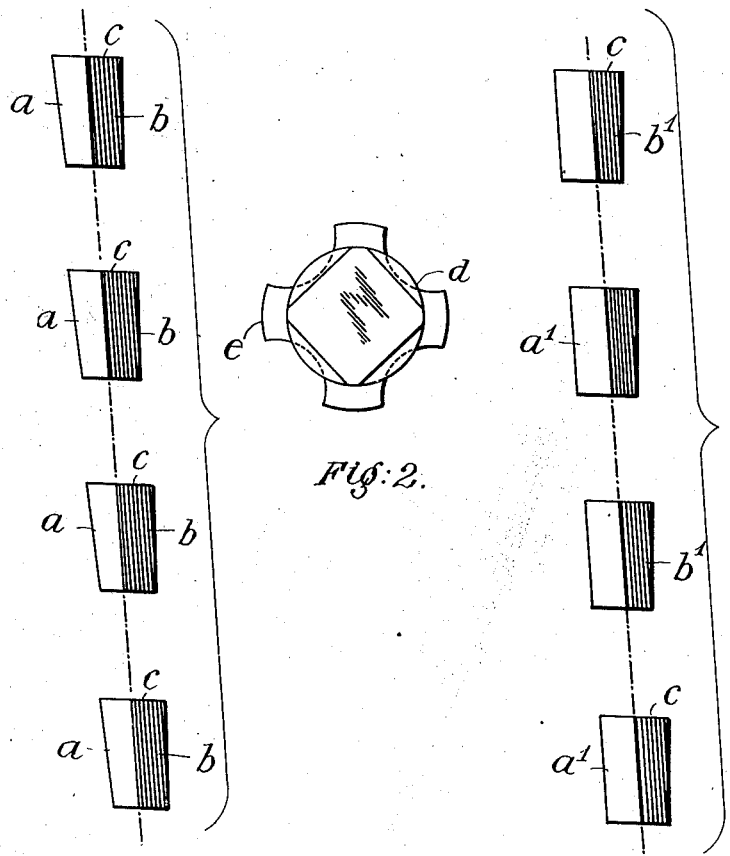
Fig:3.  Fig:2.  Fig:4.

Patented May 18, 1943

2,319,544

UNITED STATES PATENT OFFICE 2,319,544

THREAD CUTTING TOOL

Stanley Jaffa Harley and John Ernest Wainwright, Coventry, England

Original application March 11, 1941, Serial No. 382,818. Divided and this application January 29, 1942, Serial No. 428,775. In Great Britain March 2, 1940

2 Claims. (Cl. 10—141)

This application is presented as a division of our application, Ser. No. 382,818, filed March 11, 1941, for a Method of and means for producing relief in screw threads.

This invention relates to screw thread taps and dies and has for its object to increase the efficiency thereof.

We are aware that in screw thread taps having interrupted teeth in which one of each two teeth is eliminated in each longitudinal clearance groove and in which the projection at the side of one groove corresponds to a recess at the side of the next groove, it has already been proposed to back off the teeth laterally and at the same time along the diameter of the tool, the core remaining of circular shape.

We are also aware that in screw thread taps in which the teeth on one land are staggered in relation to the teeth on adjacent lands it has been proposed to give the teeth unilateral and radial relief.

Screw thread taps and dies embodying the present invention are characterized in that one or both flanks of each thread on each land of the tap or die is or are progressively relieved by forming it or them to a different helix than the mean helix of the thread, and in that the threads at their major diameter are formed concentric or approximately concentric with the rotational axis of the tap or die. Where bilateral relief is required one flank of each thread is formed to a greater helix and the opposite flank to a lesser helix than said mean. Alternatively, the relief may be unilateral, one flank only of each thread being formed to a helix different from the mean helix. In either case any tendency for a tap or die relieved in this way to chatter when in active use is eliminated by forming the relieved thread with concentric, or approximately concentric, radially outer and inner peripherally extending faces or contours, which also provides for a fine degree of accurately controlled relief.

In the accompanying drawing,

Figure 1 illustrates the application of the invention in one of its forms to a screw thread tap.

Figure 2 is an end view of the same as seen from the right hand of Figure 1.

Figure 3 represents a plan view of one helice, including the four cutter portions or teeth thereof as shown in Figure 2, of the tap shown in Figure 1 as though the same had been stripped as a veneer from Figure 1 and straightened out; and Figure 4 is a similar view of an alternative form of relieved thread having unilateral relief.

Referring to the form of relieved thread shown in Figures 1 and 3 one flank $a$ of each thread of each land of the tap is formed to a greater helix than the mean helix of the thread, represented by the chain dotted line in Figure 3, and the opposite flank $b$ is formed to a lesser helix than said mean, $c$ being the cutting or leading end of the thread. In this form each thread has, therefore, a bi-lateral relief the threads on each land being of taper form in plan thereby providing free access of lubricant and preventing accumulation of particles of removed material between the tap or die and the work-piece.

In the alternative form represented in Figure 4, the thread has a uni-lateral relief, one flank $b^1$ of each thread on each land of the tap or die being formed to a lesser helix than the mean helix of the thread, represented by the chain dotted line, the opposite flank $a^1$ of each thread being formed to the said mean.

The relieved tap or other screw thread forming tool may be produced according to this invention at a single grinding or cutting operation in any suitable manner by means of a multi-ribbed grinding wheel or tool and the laterally relieved threads will or may have concentric or approximately concentric radially inner and outer peripherally extending faces or contours $d$, $e$, as seen in Figure 2.

Alternatively, the tap or the like could, of course, be produced by multiple cuts using a single-ribbed grinding wheel or cutting tool and dividing out or relocating the work-piece.

We claim:

1. Thread cutting tools of the character described having thread-cutting portions of which the extreme radially outer peripheral portions define arcs substantially concentric with the axis of the tool and in which at least one flank of each thread is formed to a different helix than the mean helix of the thread.

2. Thread cutting tools of the character described having thread-cutting portions of which the extreme radially outer peripheral portions define arcs substantially concentric with the axis of the tool and in which each flank of each thread is formed to a different helix than the mean helix of the thread.

STANLEY JAFFA HARLEY.
JOHN ERNEST WAINWRIGHT.